(12) United States Patent
Helstern et al.

(10) Patent No.: US 10,281,620 B1
(45) Date of Patent: May 7, 2019

(54) RUGGEDIZED SAFETY MIRROR HAVING POLYMETHYLMETHACRYLATE LAYERS AND EMBEDDED NEODYMIUM MAGNETS

(71) Applicant: OPTIC CLEAR SOLUTIONS, LLC, Anaheim, CA (US)

(72) Inventors: Robert P. Helstern, Irvine, CA (US); Samkol Truong, Anaheim, CA (US); Ace Chris Flores, Irvine, CA (US)

(73) Assignee: OPTIC CLEAR SOLUTIONS, LLC, Anaheim, CA (US)

( * ) Notice: Subject to any disclaimer, the term of this patent is extended or adjusted under 35 U.S.C. 154(b) by 0 days.

(21) Appl. No.: 15/865,087

(22) Filed: Jan. 8, 2018

(51) Int. Cl.
| | |
|---|---|
| *G02B 1/04* | (2006.01) |
| *G02B 5/08* | (2006.01) |
| *G02B 5/20* | (2006.01) |
| *G02B 7/182* | (2006.01) |
| *G02B 27/10* | (2006.01) |
| *G02B 1/14* | (2015.01) |
| *A47G 1/17* | (2006.01) |

(52) U.S. Cl.
CPC .............. *G02B 1/14* (2015.01); *G02B 1/04* (2013.01); *G02B 5/0808* (2013.01); *G02B 5/208* (2013.01); *G02B 7/182* (2013.01); *G02B 27/1006* (2013.01); *A47G 1/17* (2013.01)

(58) Field of Classification Search
CPC ... A47G 1/17; B60J 3/04; B60R 1/083; G02B 1/04; G02B 1/14; G02B 1/115; G02B 5/003; G02B 5/0808; G02B 5/208; G02B 5/22; G02B 5/223; G02B 5/26; G02B 5/28; G02B 7/182; G02B 7/198; G02B 26/0816; G02B 27/1006; G02B 27/148
USPC ....... 359/350, 359, 360, 361, 514, 580, 582, 359/584, 585, 589, 597, 602, 603, 608, 359/614, 839, 870, 871, 884, 885, 892
See application file for complete search history.

(56) References Cited

U.S. PATENT DOCUMENTS

| | | | | |
|---|---|---|---|---|
| 4,010,088 | A * | 3/1977 | Okubo | C08F 2/46 522/168 |
| 4,310,978 | A * | 1/1982 | Stern | B29C 65/7441 156/73.3 |
| 5,552,927 | A * | 9/1996 | Wheatly | G02B 1/04 359/359 |
| 6,382,807 | B1 * | 5/2002 | Chandross | G02B 5/08 359/838 |
| 2017/0134660 | A1 * | 5/2017 | Truong | H04N 5/23293 |
| 2017/0345349 | A1 * | 11/2017 | Truong | G09F 15/0012 |

* cited by examiner

*Primary Examiner* — Stephone B Allen
*Assistant Examiner* — Ryan S Dunning
(74) *Attorney, Agent, or Firm* — Paul D. Chancellor; Ocean Law

(57) ABSTRACT

A mirror assembly including a viewable primary cover with a free surface, the primary cover made of optically clear molecular cross-linked material and opposite the primary cover a secondary cover made of optically opaque cell cast polymer with ultraviolet absorbing pigments, between the covers a reflective portion applied to the secondary cover.

1 Claim, 7 Drawing Sheets

RUGGEDIZED SAFETY MIRROR HAVING POLYMETHYLMETHACRYLATE LAYERS AND EMBEDDED NEODYMIUM MAGNETS

INCORPORATION BY REFERENCE

This application incorporates by reference, in their entireties and for all purposes, the disclosure of the following patents and/or patent application publications relating to ruggedized devices: U.S. Pat. Application No. 20170134660A1 by Truong and Helstern, US 2017-0345349 A1 by Truong and Helstern, and US 2006-0120816 A1 by Morimoto.

BACKGROUND OF THE INVENTION

Field of the Invention

The present invention relates to optical devices. In particular, a multilayer safety mirror withstands physical abuse while continuing to provide a highly reflective surface.

Discussion of the Related Art

Mirrors are well known. They may be made from coated glass, polished stainless steel, or coated extruded plastic sheets. Each has its drawbacks when used and these drawbacks may become particularly evident in a harsh or threatening environment.

Glass mirrors require special handling and care during installation, cleaning and use. They are known for a hard surface that is scratch resistant and easily cleaned. However, since these mirrors are constructed from coated glass, they are easily broken producing shards of glass that are difficult to handle without injury. And, in some applications with moisture contamination, for example applications in high humidity environments, the environment can eventually corrode the reflective coating provided on glass substrates.

Another consideration attendant to the use of glass mirrors is the mounting system. Glass mirrors are usually heavy and typical wall materials such as dry wall and sheet rock may not provide a competent mounting surface.

Where mirrors will be used in public or institutional areas either as a vanity appliance or for security monitoring, they may be constructed from a sheet of stainless steel which is polished to provide a "mirror-like" reflective surface. This surface exhibits excellent shatter resistance, but fails its main purpose in that its reflectivity is less than that of glass mirror.

Extruded plastic sheets may also be used in making mirrors. A coating on these sheets provides a reflective or mirror-like surface. But, the plastic substrate may produce shards under aggressive impact loads as it is typically brittle.

Notably, mounting systems for non-glass mirrors with reflective metal or extruded plastic backplanes are also problematic. For example, these backplanes can be dislodged or broken and subsequently weaponized. And, in some applications with moisture contamination, for example that found in high humidity environments, the environment can eventually cause corrosion and/or degrade the metal or metalized reflective backplane of non-glass mirrors.

SUMMARY OF THE INVENTION

An improved mirror includes a primary cover that is colorless and optically clear. An optional polysiloxane treated outermost primary cover surface is also colorless and optically clear. In some embodiments a tint or coloring of the primary protective cover is applied to adjust for unique situational lighting.

A secondary protective cover that is black in color and optically opaque to the visible spectrum incorporates an aluminum deposition on the innermost surface. The aluminum deposition is disposed facing the innermost surface of the primary cover.

The secondary cover serves as a means to carry and protect the aluminum deposition layer and may provide a mounting means. For example, a plurality of magnets may be disposed within the secondary cover such that mounting is by way of magnetic force coupling.

The aluminum deposition layer is a reflective medium between the primary and secondary covers. In various embodiments, the reflective layer is evaporated aluminum that is opaque. The aluminum layer or coating may be applied by an ion gun evaporated process.

In one example of the invention, the aluminum deposition is optically opaque and reflects an average of 95% of light that corresponds to the visible spectrum (400 nanometers to 780 nanometers). However, it is contemplated that other spectral reflectance signatures of the reflective layer could be formed by the evaporation process.

The primary cover is laminated to the secondary cover by using a non-corrosive optical grade adhesive. A frame or decorative frame is provided which covers the edges of the laminate. It should be appreciated that the frame is optional and can vary in style and color.

There is a need to improve the quality, durability and safety aspects of mirrors in general. Embodiments of the present invention provide rugged mirrors for use in various applications. These mirrors provide an excellent reflective quality and minimize glare. They may be encased in a durable shatter resistant housing resistant to degradation caused by graffiti, chemicals, moisture, and wear. Embodiments of the present invention are also lightweight and easily mounted to surfaces, for example to ferrous metal surfaces.

To provide improved moisture and shatter resistance, embodiments of the present invention locate the reflective interlayer between primary and secondary covers that comprise a cross linked polymethylmethacrylate. The primary layer has an optically clear composition, while the secondary layer is optically opaque. The reflective interlayer provides over 95% reflectivity at its surface. Graffiti, chemical, and wear resistance may be enhanced by a silicon based coating on the outermost surface of the primary cover. Neodymium magnets may be located or encapsulated in the secondary cover to provide a coupling force with attachment to a ferrous metal mounting surface or to a ferrous metal wall anchor.

An optional frame or decorative frame may be provided to enclose the peripheral edges of the mirror primary and secondary covers. Cleaning and care of the ruggedized mirror can be accomplished with a dry microfiber cloth as cleaning with solvents is not generally needed to restore the mirror's pristine appearance.

BRIEF DESCRIPTION OF THE DRAWINGS

The present invention is described with reference to the accompanying figures. These figures, incorporated herein and forming part of the specification, illustrate some embodiments of the invention and, together with the description, further serve to explain its principles enabling a person skilled in the relevant art to make and use the invention.

The foregoing and other features of the present invention will become more apparent upon a consideration of the following description taken in connection with the accompanying drawings, wherein.

DETAILED DESCRIPTION OF THE PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the terms "coupled" and "attached" include direct and indirect connections. Moreover, where first and second devices are coupled or attached, intervening devices including active devices may be located therebetween.

Figure 1:
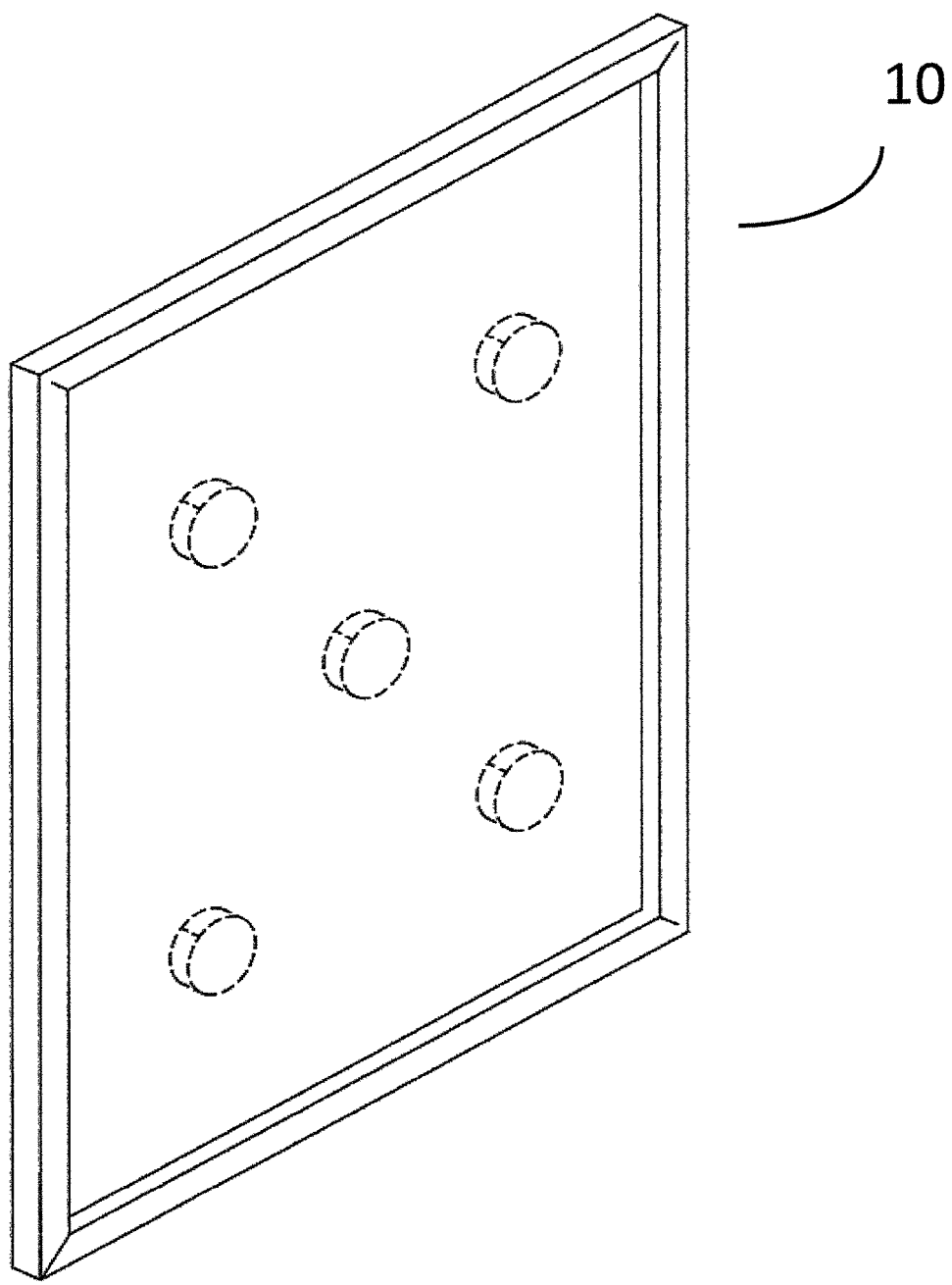
FIG. 1 is a schematized view of the ruggedized safety mirror constructed in accordance with the present invention.

FIG. 1 shows an embodiment of a ruggedized safety mirror 10. Visible in this figure are mirror elements including a primary/front cover 11 and an optional frame 17.

Figure 2:
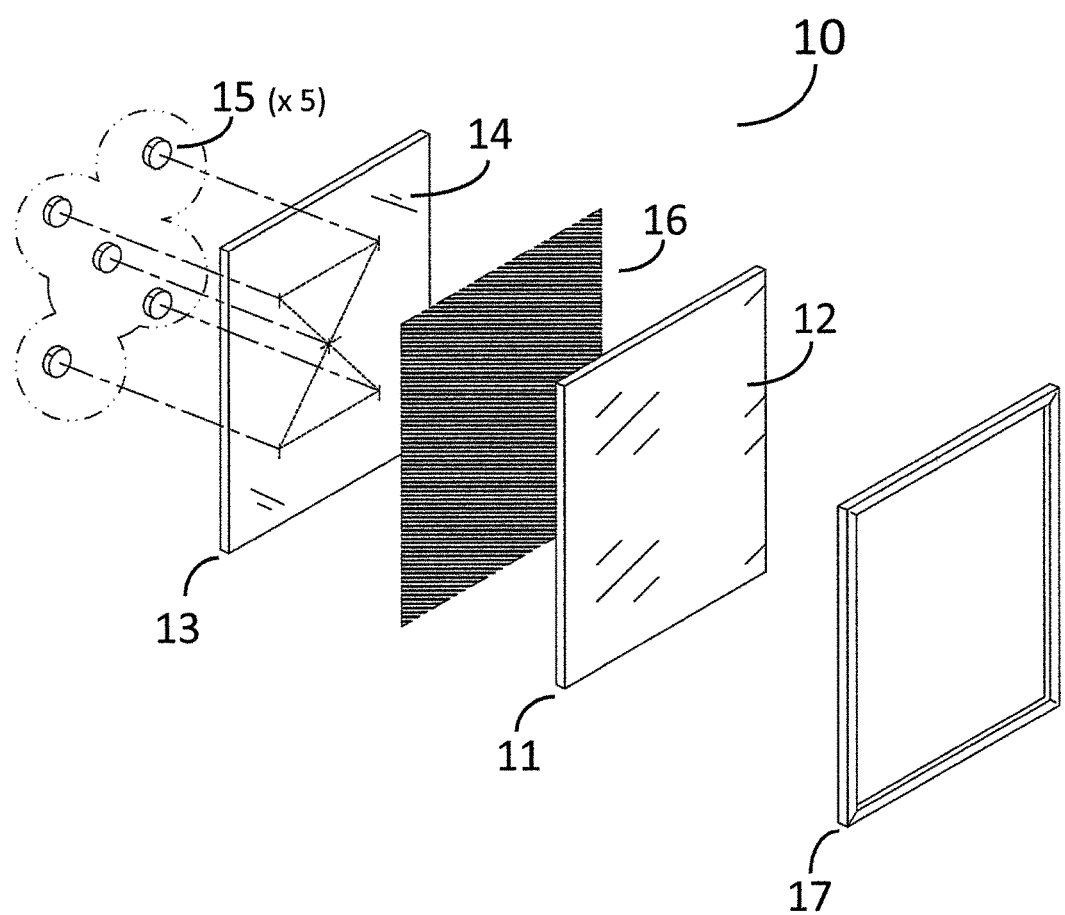
FIG. 2 is an exploded fragmentary view of one specific preferred embodiment of the invention.

FIG. 2 shows an exploded diagram of a ruggedized safety mirror. In an illustrative embodiment, the ruggedized mirror has a rectangular configuration with a length of 558 mm, a width of 381 mm, and a cross-sectional thickness of 7.6 mm. Optional magnets 15 are located behind the primary cover and may be embedded in a secondary/back cover 13.

The mirror includes an optically clear primary cover 11, a reflective interlayer 14 and an optically opaque secondary cover 13. The mirror primary cover 11 may be laminated with the mirror back cover 13 to improve moisture and shatter resistance.

In some embodiments a plurality of magnets such as Neodymium magnets may be disposed adjacent to or encapsulated within the secondary cover 13 to provide a means for mounting. As shown, a frame or decorative frame 17 may be provided.

Primary Cover

The primary cover 11 is transparent. It is separated from the secondary cover 13 by a reflective interlayer 14. In various embodiments the primary cover is disposed as the outermost optical component of the ruggedized safety mirror.

Materials used to construct the primary cover include optically clear cell casted polymethlymethacrylate. Polymethylmethacrylate's light transmission is greater than 90% while that of a glass equivalent is approximately 88%. Further, polymethylmethacrylate is easily machined or cut, has overall good durability as compared to glass, and has a mass density lower than glass while exhibiting high strength at thin cross-sections.

In some embodiments a high degree of flatness of the primary cover is required to provide good image reproduction. The horizontal cell casting process is uniquely able to provide acrylic sheet with flat surface(s). In this process, the mold includes opposed glass sheets that have a high degree of flatness. Flatness is judged by a geometric dimensioning and tolerancing measure that references two parallel planes (parallel to the surface that it is called out on) to define a zone where the entire reference surface must lie. As such, a flatness tolerance is always less than the dimensional tolerance associated with it.

The flatness tolerance may be measured with monochromatic light where values are in waves ($\lambda$) which are multiples of the wavelength of the testing source. One fringe corresponds to ½ of a wave. In various embodiments, the flatness of the primary cover or its viewable surface may be better than or equal to 1$\lambda$ (typical grade), better than or equal to $\lambda/2$, better than or equal to $\lambda/4$ (precision grade), or better than or equal to $\lambda/20$ (high precision grade). In some embodiments, sheet flatness over the envelop dimensions given herein are 0.177 mm to 0.254 mm.

The primary cover may be made from a polymer that is comprised of 1-2% molecular cross linking such as a polymethlymethacrylate polymer. The polymer may include ultra violet absorbing pigments or inhibitor dyes that can absorb approximately 95% of the incident ultraviolet spectral irradiance and may be operable in the 200 nm to 400 nm portion of the electro-magnetic spectrum. For example, UV absorption in this bandwidth is effective in mitigating the yellowing and weakening of the polymer/plastic from many years of sunlight exposure. UV dyes include a phenol manufactured by BASF known as Tinuvin P which behaves as a strong UV light absorber belonging to the hydroxphenyl benzotriazole family. This phenol is a long term photostabilizer that is good for a variety of polymers. The requirements per ASTM-D-4802, class al, may determine the use level of 0.2% to 0.5%. Accelerated testing in strong UV radiation ambients confirms long life up to 30 years of continuous exposure to solar radiation or fluorescent light emission.

Other methods of primary cover manufacturing may be used. For example, extruded materials may be used where, for example, the extrusion process provides a required primary cover flatness. Notably, these materials may not be suitable for making primary covers because they are mechanically soft and may not be suitable for machining or cutting and because they are too brittle which results in the lack of the overall impact resistance required by the optical thickness constraints of the some embodiments of the invention. Further, when cell cast acrylic materials with 1-2% molecular cross-linking are used, brittleness is typically not a problem.

In some embodiments, other polymer based optically clear plastics can be used to make the primary cover, for example, polycarbonate. However, polycarbonate may deteriorate rapidly due to the environment and so applications using polycarbonate may be limited. It is also noteworthy to mention that for the same reasons given regarding thermoformed acrylics, cell cast acrylic tend to be a better choice than polycarbonate.

In an embodiment, a polysiloxane coating 12 is applied to the very outermost surface of the primary cover. This coating augments surface resistance to paints, mechanical deformation, chemical attack, and surface contaminants.

In a particular embodiment, the cross-sectional thickness of the primary cover 11 is in the range of 2.0 to 6.0 mm. In a particular embodiment, the cross-sectional thickness of the primary cover 11 is about 3.3 mm. In some embodiments the thickness of the primary cover will have a commercially available tolerance or a tolerance of about +/−20%. For example, a nominal 3.3 mm cover may have a thickness in the range of about 2.75 to 3.96 mm.

While other thicknesses may be used, it is advantageous to limit the nominal cross section thickness so that a) resistance to impact and b) optical/mirror clarity are optimized. The optically clear primary cover may be obtained from commercial cell cast acrylic supplier Optical Polymers Laboratory of Pawtucket, R.I.

Secondary Cover

The secondary cover 13 is opaque. It is separated from the primary cover 11 by the reflective interlayer 14. In various embodiments the secondary cover is disposed as the innermost optical component of the ruggedized safety mirror.

The secondary cover material may be formed from an optically opaque cell cast polymethlymethacrylate polymer, for example a polymer with 1-2% molecular cross-linking. In some embodiments the material is characterized by low light transmission characteristics of less than 1% total light transmission throughout the visible spectrum.

Polymethlymethacrylate is compatible with machining or cutting and the material is mechanically durable. In some embodiments the polymer includes ultra violet absorbing pigments or inhibitor dyes that can absorb approximately 95% of the incident ultraviolet spectral irradiance while operating in the 200 nm to 400 nm portion of the electromagnetic spectrum. For example, UV absorption in this bandwidth is effective in mitigating the deterioration of the plastic following many years of UV exposure to natural or artificial light.

In an exemplary embodiment, the cross-sectional thickness of the secondary cover is in a range of about 3.0 to 6.0 mm. In a particular embodiment the cross-sectional thickness is about 4.1 mm. In some embodiments the thickness of the secondary cover will have a commercially available tolerance or a tolerance of about +/−20%. For example, a nominal 4.1 mm cover may have a thickness in the range of about 3.42 to 4.92 mm.

While other thicknesses may be used, some embodiments may require that the section thickness of the secondary cover be 124% of the section thickness of the primary cover. This difference in thickness permits for encapsulating the plurality of magnets 15 mentioned above. The optically opaque secondary cover may be obtained from commercial cell cast acrylic supplier Optical Polymers Laboratory of Pawtucket, R.I.

Secondary Cover, Plurality of Magnets

The above mentioned magnets 15 may be adjacent to or within the secondary cover 13. For example, the magnets may be adhered to the secondary cover or the magnets may be encapsulated within the secondary cover. When encapsulated, the surfaces of the secondary cover need not reflect the presence of a magnet.

In an embodiment the magnets are disposed equidistantly in a bowtie array. For example, five magnets may be used to outline the bowtie. Magnets may be disc shaped and made from Neodymium material.

In an embodiment, the magnet diameter is 25.4 mm and the cross-sectional thickness of the magnet is 3.1 mm. Estimates of the magnetic pull force range from 4.5 kg to 5.4 kg. It is believed that this force is adequate to hold the embodiments of the mirror 10 in a horizontal or a vertical orientation with respect to a wall or another surface as the weight of the mirror is estimated to be less than 0.45 kg.

The number of magnets and the arrangement of the magnets may differ from that described above given the dependency of the variables on the size of the mirror and the size of the magnets.

During fabrication of the mirror, the magnets may be arranged and suspended in a mold prior to pouring of the liquid acrylic resin forming the pre-polymerized secondary covering 13. After polymerization of the acrylic resin, the plurality of magnets is held in place by the surrounding hardened resin.

In an embodiment, approximately 0.5 mm of secondary cover acrylic resin covers each side of the magnet 15 such that the surface of the secondary cover remains flat. Notably, a thin acrylic covering, for example 0.5 mm, avoids excessive loss of magnetic force when the mirror 10 is magnetically coupled with a ferrous surface.

Other magnet/resin cross sections could be utilized, but it should also be appreciated that the relationship of magnetic pull force, size of the magnet and structural integrity of the resin cross section should be considered. In addition, where the secondary cover 13 is the structural backplane of the mirror 10 its design must accommodate anticipated loads. The optically opaque secondary cover may be obtained from commercial cell cast acrylic supplier Optical Polymers Laboratory of Pawtucket, R.I.

Reflective Interlayer

Figure 3:
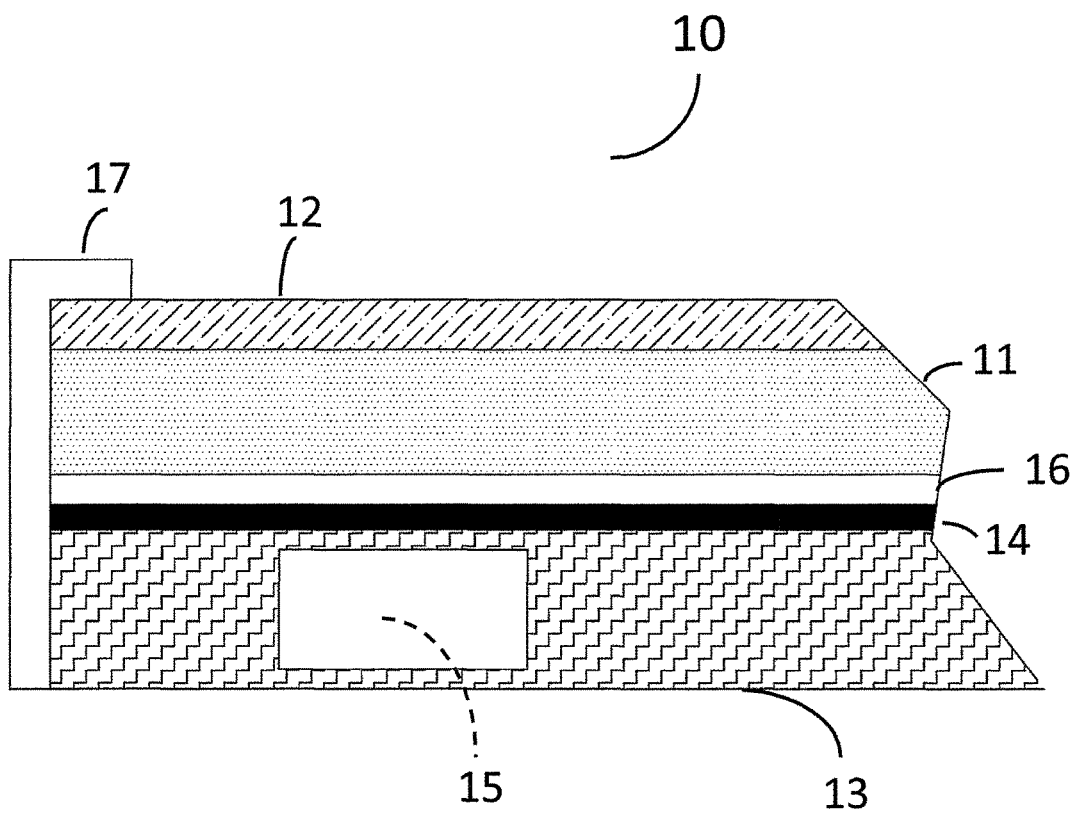
FIG. 3 is a magnified cross sectioned view of one specific embodiment of the invention.

As seen in FIG. 3, the reflective interlayer 14 is located between the clear primary cover 11 and the opaque secondary cover 13. The reflective interlayer 14 may be applied to the secondary cover 13 in various ways known to skilled artisans. For example, the reflective interlayer may be applied using evaporated aluminum that adheres well to the innermost side of the optically opaque secondary cover.

Figure 4:
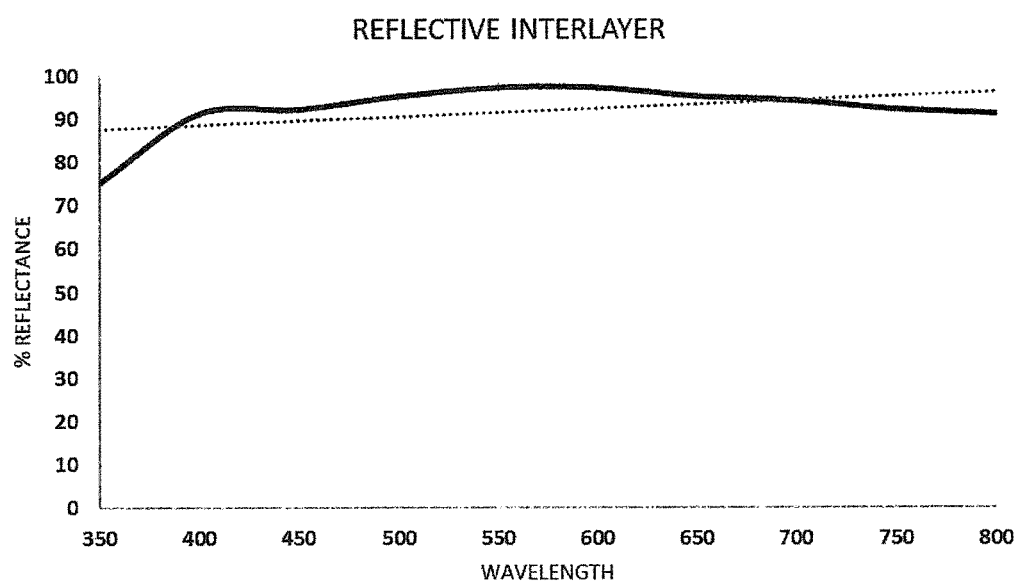
FIG. 4 is a graphical representation of the reflective interlayer specification.

In a particular embodiment, the reflective interlayer is applied using an ion gun evaporation process. This method of application is consistent with high reflectivity and uniformity across the complete surface of the secondary cover. In various embodiments the spectral reflectance of the reflective interlayer is 90% average across the visible spectrum of 400 nm to 780 nm at its surface. The spectral response of the aluminum deposition is illustrated in FIG. 4. The thickness of the deposition may be in the range of 3 to 7 ums. The thickness of the deposition may be about 5 ums.

Adhesive Layer, Laminate

In an embodiment, an adhesive layer 16 is applied to mechanically couple the clear primary cover 11 to the optically opaque secondary cover 13. The adhesive coating may be coterminous with the extent of the covers and it may be applied to either cover or prepared as a blanket to be sandwiched between the covers.

For example, an optically clear polyvinyl butyl layer may be located between the primary cover 11 and the secondary cover 13. Here, an autoclave is used to cure the polyvinyl butyl layer under temperature and pressure. This ensures that the laminate completely inhibits moisture penetration and seals or hermetically seals the assembly.

Decorative Frame—Optional

In an embodiment, a frame or decorative frame 17 is provided. The frame encloses the peripheral edges of the ruggedized safety mirror. In various embodiments the frame is constructed from drawn aluminum such as drawn aluminum having an "L" shaped cross-section. The aluminum may be finished with a weather resistant chemical film. In a particular embodiment, the thickness of the frame is 0.5 mm. That is to say each leg of the "L" has a thickness of 0.5 mm. The frame may be press fitted over the primary 11 and secondary 13 covers, glued to the covers, or otherwise fixed in place to form the mirror 10.

Two Way Viewing

As mentioned above, the invention features a secondary cover 13 that is optically opaque. In yet another embodiment, the spectral transmission of the secondary cover is be adjusted or occluded to provide light transmission in the near infrared portions of the electromagnetic spectrum while remaining visibly opaque. Further, the reflective interlayer 14 thickness is adjusted to allow infrared light transmission.

By providing infrared light transmission through both the reflective interlayer 14 and the secondary cover 13, an observer viewing the secondary cover's free surface 21 (see FIG. 5) may to surveil images through the ruggedized safety mirror 10 using an infrared camera or image intensifier. This may be accomplished while observers of the primary cover 11 are unaware they are being observed.

Non-Ferrous Surface Mounting System

Neodymium magnets 15 may be disposed directly into the optically opaque layer that is the secondary cover 13. This provides a means of coupling the mirror 10 to a ferrous metal mounting surface or to a ferrous metal wall anchor. Where the mounting surface is non-ferrous, what is needed is a ferrous item such as the earlier mentioned anchor which is embedded in the non-ferrous surface.

Ferrous anchors may be used with non-ferrous building materials such as drywall or sheetrock, ceramic tile, wood paneling, masonry, plastic, or the like. These anchors are specifically intended for use with magnetic mounting systems.

Here, a ferrous metal embodiment includes helical ridges that permit the complementary invention to be inserted into non-magnetic host material and also provides a surface to interface with magnetic coupling mounting systems. A hex shaped hole in the fastener may be engaged by a tool used to rotate the fastener and to advance the fastener into a non-ferrous wall.

Figure 5:
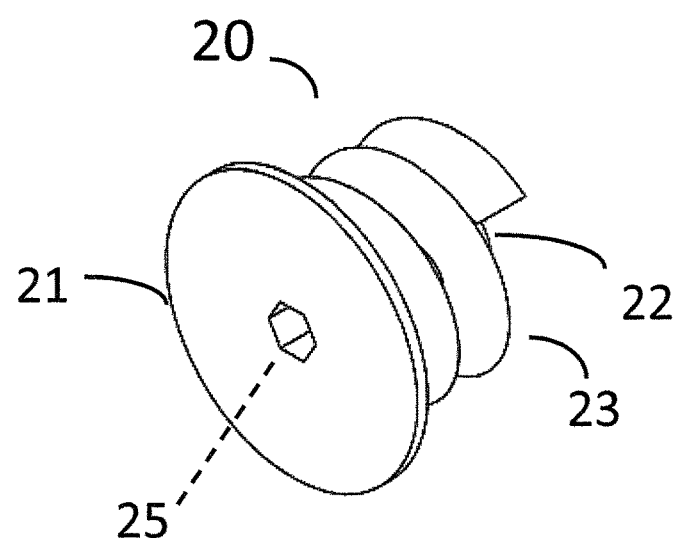
FIG. 5 is a schematized view of the complementary invention.
Figure 6:
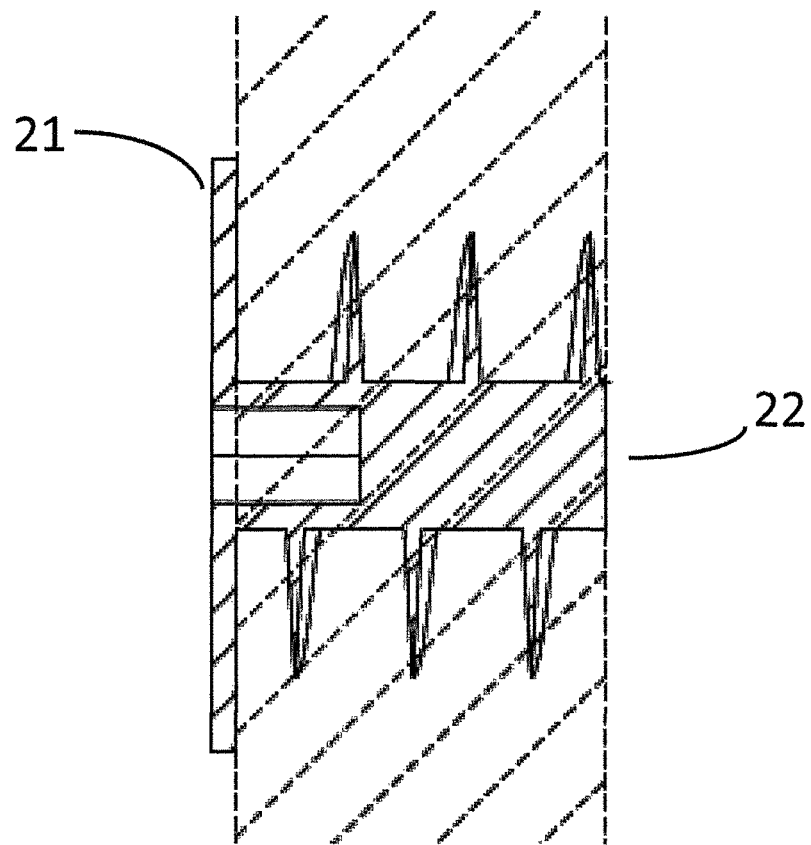
FIG. 6 is a measured schematized multiple view of the complementary invention.
Figure 7:
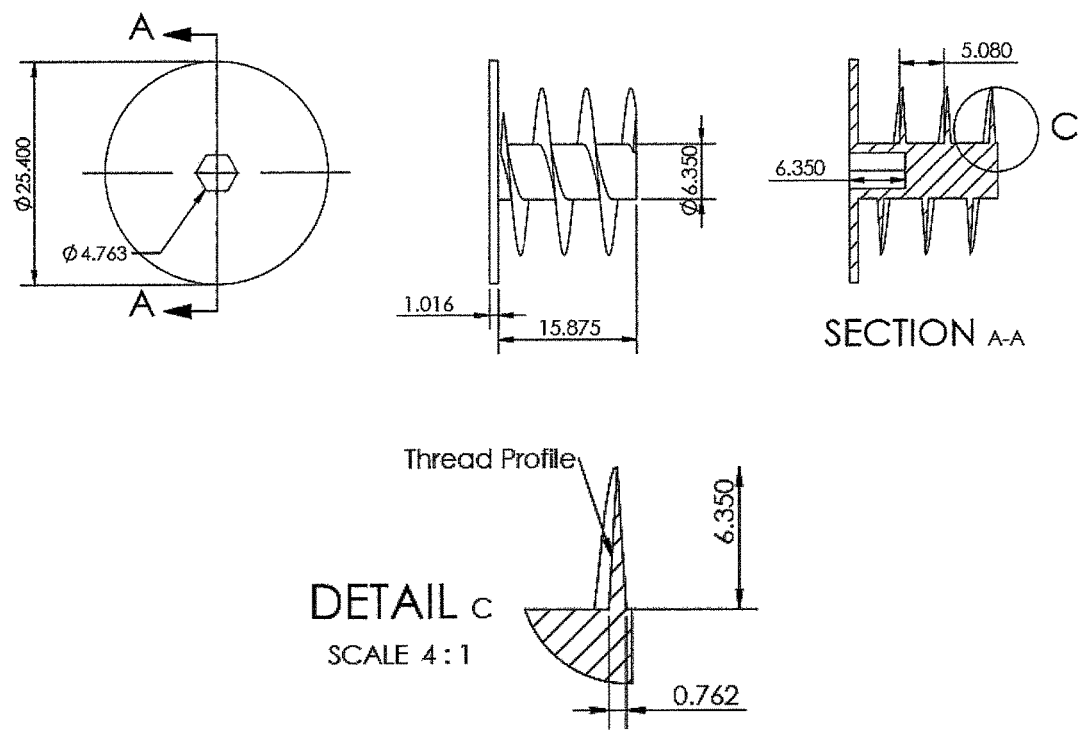
FIG. 7 is a cross section view of one specific preferred embodiment of the complementary invention as applied to a non-ferrous material.

FIGS. 5-7 show the ferrous fastener, details of construction of the ferrous fastener, and use of the ferrous fastener.

In FIG. 5, a ferrous metal wall/surface fastener anchor 20 is provided for magnetically coupling with a magnet 15 of the mirror 10. The fastener anchor includes a screw stem and disc shaped surface on one end 21. In a particular embodiment, the disc is about 25 mm in diameter and has a thickness of about 1.0 mm. The screw stem 22 has plural helical ridges 23 on the outside surface that transverse about 15 mm along the horizontal axis of the screw stem 22. The helical ridges provide a means of inserting and holding the anchor in the host material.

In some embodiments the helical ridges 23 form a cutting blade shaped like a triangle. The triangular shaped blades may be set at an obtuse angle, for example a 135-degree angle, and pitched to achieve a displacement, for example about 5 mm displacement, while extending vertically, for example to a vertical height of 6.35 mm from the outermost surface of the stem. A hex hole 25 in the disc allows insertion of a hex tool such as a common 4.76 mm hex tightening/driving tool.

The fastener anchor may include iron or iron-carbon alloy (steel). Notably, other alloys with magnetic effect may be utilized where they meet applicable magnetic coupling specifications. In a preferred embodiment, the iron-carbon content of the steel is about 0.003% to 2% per unit weight. A black oxide finish may be applied to the fastener to inhibit corrosion.

The present invention has been disclosed in the form of exemplary embodiments. However, it should not be limited to these embodiments. Rather, the present invention should be limited only by the claims which follow where the terms of the claims are given the meaning a person of ordinary skill in the art would find them to have.

What is claimed is:

1. A mirror assembly comprises:
a primary cover with a free surface that is viewable and a secondary cover with a free surface;
between the covers a reflective interlayer that is applied to the secondary cover;
the primary cover made of optically clear cell cast polymethylmethacrylate, a clear polymer with a light transmission characteristic of greater than 90% throughout the visible spectrum;
molecular cross-linking in the clear polymer of the primary cover in the range of 1 to 2%;
in the clear polymer ultraviolet absorbing pigments or inhibitor dyes absorb 95% of incident ultraviolet spectral irradiance in the 200 nm to 400 nm portion of the electromagnetic spectrum;
the primary cover having a free surface flatness tolerance of $\lambda/4$ and a thickness of 2 to 6 mm;
the secondary cover made of optically opaque cell cast polymethylmethacrylate, an opaque polymer with light transmission characteristic of less than 1% throughout the visible spectrum;
molecular cross-linking in the opaque polymer of the secondary cover in the range of 1 to 2%;
in the opaque polymer ultraviolet absorbing pigments or inhibitor dyes absorb 95% of incident ultraviolet spectral irradiance in the 200 nm to 400 nm portion of the electromagnetic spectrum; and,
the secondary cover having a thickness of 3 to 6 mm and neodymium magnets embedded in the opaque polymer such that opposing surfaces of the opaque polymer remain flat.

* * * * *